United States Patent [19]
McDonnell et al.

[11] Patent Number: 5,402,270
[45] Date of Patent: Mar. 28, 1995

[54] METHOD OF DUPLICATING DATA ON A MAGNETIC DISK WITH REDUCED DUPLICATION TIME

[75] Inventors: Kevin McDonnell, Pleasanton; George Barker, deceased, late of San Jose, both of Calif., by Cindy S. Barker, legal representative

[73] Assignee: Trace Mountain Products, Inc., San Jose, Calif.

[21] Appl. No.: 296,451

[22] Filed: Aug. 26, 1994

Related U.S. Application Data

[63] Continuation of Ser. No. 197,675, Feb. 17, 1994, abandoned, which is a continuation of Ser. No. 819,391, Jan. 10, 1992, abandoned.

[51] Int. Cl.$^6$ .............................................. G11B 5/86
[52] U.S. Cl. ..................... 360/15; 360/72.1; 360/50
[58] Field of Search ............. 360/15, 78.14, 77.05, 360/77.07, 78.04, 77.02, 72.1, 72.2, 50

[56] References Cited

U.S. PATENT DOCUMENTS 4,310,861  1/1982  Kashio ............................. 360/50
4,811,317  3/1989  Barnard et al. ..................... 369/32
5,068,755  11/1991 Hamilton et al. ................. 360/72.1
5,087,996  2/1992  Williams et al. ................. 360/78.01

FOREIGN PATENT DOCUMENTS 1554641  10/1979  United Kingdom .

Primary Examiner—Aristotelis Psitos
Assistant Examiner—Larry Cullen
Attorney, Agent, or Firm—Albert C. Smith; Dennis S. Fernandez

[57] ABSTRACT

A method for duplicating data on a rotating magnetic disk in sectors on concentric tracks so that the sectors are aligned with each other from track to track and referenced to an index mark. The index mark is sensed as the disk rotates. The time elapsed between sensed index marks is counted to define the angular displacement of the disk. A magnetic head is moved successively to the tracks on the disk. Data to be duplicated is recorded in sequence, sector by sector, on the respective tracks beginning at different offsets from the index mark such that recording begins with the next sector encountered after the head arrives at the respective tracks.

4 Claims, 2 Drawing Sheets

METHOD OF DUPLICATING DATA ON A MAGNETIC DISK WITH REDUCED DUPLICATION TIME

RELATED APPLICATIONS

This is a continuation of application Ser. No. 08/197,675, now abandoned, filed on Feb. 17, 1994, which is a continuation of abandoned Ser. No. 07/819,391, filed on Jan. 10, 1992.

BACKGROUND OF THE INVENTION

This invention relates to the field of magnetic data recording and, more particularly, to a method for duplicating data on a rotating magnetic disk.

Publishers of consumer software must make many copies of their works for distribution and sale to the public. Efficient use of the duplicating equipment is an important consideration in software publishing because of the cost of production. A commonly used medium for distributing consumer software is a floppy disk on which the data is stored in modified frequency modulation (MFM) format so that data is organized on concentric tracks in sectors referenced to an index mark. As a result, the sectors of all the tracks are aligned with each other, e.g. physical sector 3 starts at the same angular displacement from the index mark and ends at the same angular displacement from the index mark. Conventional techniques for duplicating data on a floppy disk in MFM format are synchronized to start duplicating each track at the index mark and thus require three revolutions to duplicate each track—the first revolution to record the data, the second revolution to check the data, and the third revolution to move the recording head to the next track and wait for the index mark to start recording the data on the next track. Most of the third revolution represents unproductive time because the head can step to the next track in a fraction of the time it takes for the disk to rotate one complete revolution. Thus, the duplicating equipment remains idle for the better part of the third revolution while waiting for the index mark.

In some floppy disk recording formats, such as Mcintosh and Amiga, this idle time is eliminated by starting to record data beginning with sector 1, as soon as the head is repositioned on a new track. As a result, data is recorded with sector skew, i.e., the sectors are not referenced to an index, as in MFM recording. In other words, a particular sector may appear at any one of a number of positions on a track, depending upon when the head arrives at such track. Sector skewing violates the rules for MFM format and is therefore not acceptable.

SUMMARY OF THE INVENTION

According to the invention, data to be duplicated is recorded in sequence, sector by sector, on respective tracks beginning at different offsets from the index mark, such that all the sectors of data on a track are recorded in sequential order referenced to the index mark before the head moves to the next track. As soon as all the sectors on a track are duplicated, the head moves to the next track and begins to record without waiting for the index mark to occur. Preferably, recording begins with the next sector position encountered after the head arrives at the track. As a result of this offset duplication, all the sectors recorded on the disk are aligned with each other and duplication time is substantially shortened without violating the specifications of the MFM format.

The preferred embodiment of the invention is a method for duplicating data on a rotating magnetic disk in sectors on concentric tracks so that the sectors are aligned with each other from track to track and referenced to an index mark. The index mark is sensed as the disk rotates. The time elapsed between sensed index marks is counted to define the angular displacement of the disk. A magnetic head is moved successively to the tracks on the disk. Data to be duplicated is recorded in sequence, sector by sector, on the respective tracks beginning at different offsets from the index mark such that recording begins with the next sector encountered after the head arrives and settles at the respective tracks.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENT

For the purpose of illustrating the principles of the invention, it is assumed that data is to be duplicated on floppy magnetic disks in MFM format during disk rotation with a period of 100 milliseconds (msec). It is further assumed that the data is organized in forty concentric tracks, each having nine sectors referenced to an index mark, so the sectors are aligned with each other, e.g., sector 1 on each track occupies the same angular position relative to the index mark. It is also assumed that it takes a maximum of twenty-one msec for the recording head to step from track to track and to stabilize at the new track sufficiently to start recording data. It is further assumed that the remaining sectors begin after a time elapse from sector 1 shown on the following table:

TABLE 1

| Sector No. | Time Elapsed ($\mu$sec.) |
| --- | --- |
| 1 | 0 |
| 2 | 11.5 |
| 3 | 21.9 |
| 4 | 32.4 |
| 5 | 42.9 |
| 6 | 53.3 |
| 7 | 63.7 |
| 8 | 74.3 |
| 9 | 84.1 |

Figure 1:
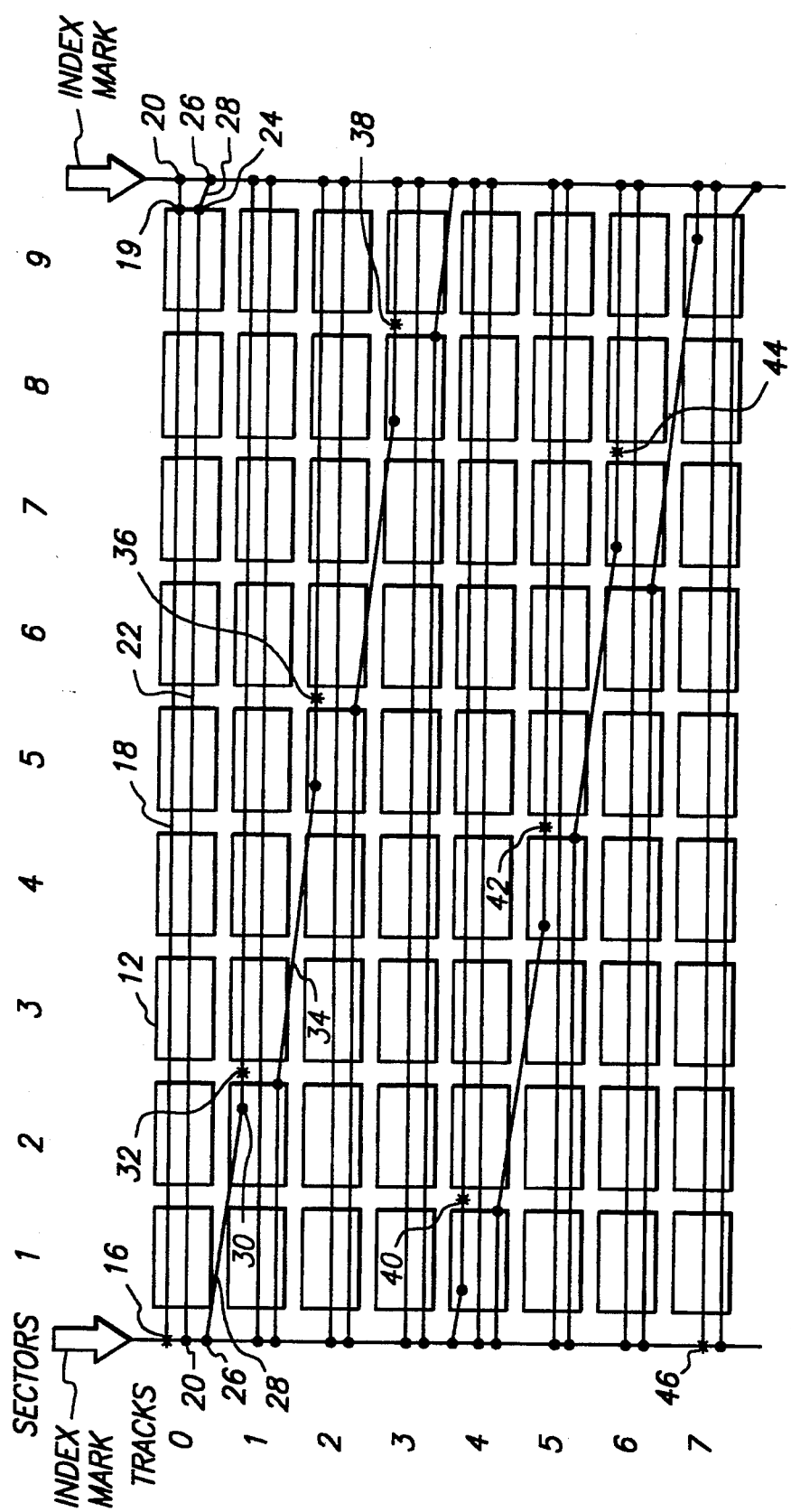
FIG. 1 is a diagram of data organization in MFM format on a floppy magnetic disk, illustrating data duplication in accordance with the principles of the invention.

FIG. 1 represents the organization of the data on the disk expanded from its actual radial layout into a rectangular layout for ease of illustration. Eight of the forty tracks are arranged in horizontal rows numbered in the left margin from 0 to 7, and the nine sectors are arranged in vertical columns numbered in the upper margin from 1 to 9. The index mark is shown on the left side and the right side to represent its repetitive occurrence each revolution as the disk rotates. The data is organized in the sectors represented by blocks, such as that designated 12. The transverse lines cutting through and between the sectors represent movement of the head as a function of time, and thus also disk position. The data duplicating process begins with the head at the index mark in track 0, which is represented as a point 16. The head begins recording data at point 16 before the beginning of sector 1, as represented by the asterisk at point 16, and, as represented by a line 18, continues to record data in sequence sector by sector until it passes the end of sector 9 represented by a point 19 and reaches the next index mark, which is represented by a point 20. After the head passes the index mark as represented by point 20, it checks, i.e., verifies, the data recorded in sectors 1 to 9 in sequence, as represented by a line 22. After the head reaches the end of sector 9 the second time, which is represented by a point 24, the recording head immediately starts to move to track 1. Specifically, the recording head moves past the index mark, as represented by a point 26, travels toward track 1, as represented by a line 28, and arrives there in sector 2, as represented by a point 30.

After arriving at track 1, the head begins recording data in the gap preceding the next sector, namely sector 3, as represented by an asterisk 32. The process described in connection with track 0 is then repeated with respect to track 1, beginning with sector 3, passing through the index mark, and ending after sector 2. When two complete revolutions have been made on track 1 beginning with sector 3, the recording head moves toward track 2, as depicted by a line 34.

After the recording head arrives at track 2, it begins to record data in the gap preceding the next sector, namely sector 6, as represented by asterisk 36. The process is repeated for tracks 3, 4, 5 and 6. Each time the recording head starts to record data in the gap preceding the beginning of the next sector it encounters after the head arrives at a track, namely, sector 9 for track 3, sector 2 for track 4, sector 5 for track 5, and sector 8 for track 6, as represented by asterisks 38, 40, 42 and 44, respectively.

The cycle is repeated beginning with track 7, as represented by an asterisk 46, which corresponds to asterisk 16 in track 0. In each case, data to be duplicated is recorded in sequence, sector by sector, on the respective tracks beginning at different offsets from the index mark such that all the sectors of data on a track are recorded before the head moves to the next track and that recording preferably begins with the next sector encountered after the head arrives at the respective tracks. This relationship is summarized on the following Table:

TABLE 2

| Track No. | Approximate Head Arrival Time | Index Offset (msec.) | Starting Sector |
|---|---|---|---|
| 0 |  | 0 | 1 |
| 1 |  | 21.9 | 3 |
| 2 |  | 53.3 | 6 |
| 3 |  | 84.7 | 9 |
| 4 |  | 11.5 | 2 |
| 5 |  | 42.9 | 5 |
| 6 |  | 74.3 | 8 |
| 7 |  | 0 | 1 |
| 8 |  | 21.9 | 3 |
| 9 |  | 53.3 | 6 |
| 10 |  | 84.7 | 9 |
| 11 |  | 11.5 | 2 |
| 12 |  | 42.9 | 5 |
| 13 |  | 74.3 | 8 |
| 14 |  | 0 | 1 |

TABLE 2-continued

| Track No. | Approximate Head Arrival Time | Index Offset (msec.) | Starting Sector |
|---|---|---|---|
| 15 |  | 21.9 | 3 |
| 16 |  | 53.3 | 6 |
| 17 |  | 84.7 | 9 |
| 18 |  | 11.5 | 2 |
| 19 |  | 42.9 | 5 |
| 20 |  | 74.3 | 8 |
| 21 |  | 0 | 1 |
| 22 |  | 21.9 | 3 |
| 23 |  | 53.3 | 6 |
| 24 |  | 84.7 | 9 |
| 25 |  | 11.5 | 2 |
| 26 |  | 42.9 | 5 |
| 27 |  | 74.3 | 8 |
| 28 |  | 0 | 1 |
| 29 |  | 21.9 | 3 |
| 30 |  | 53.3 | 6 |
| 31 |  | 84.7 | 9 |
| 32 |  | 11.5 | 2 |
| 33 |  | 42.9 | 5 |
| 34 |  | 74.3 | 8 |
| 35 |  | 0 | 1 |
| 36 |  | 21.9 | 3 |
| 37 |  | 53.3 | 6 |
| 38 |  | 84.7 | 9 |
| 39 |  | 11.5 | 2 |

The invention is preferably practiced with a Model 3020 Floppy Disk Duplicator manufactured by Trace Mountain Products, Inc., of San Jose, Calif., or functionally equivalent duplicating equipment, modified to generate offsets from the index mark and to access a track buffer so data can be copied beginning with any sector on the track in response to the offset from the index mark.

Figure 2:
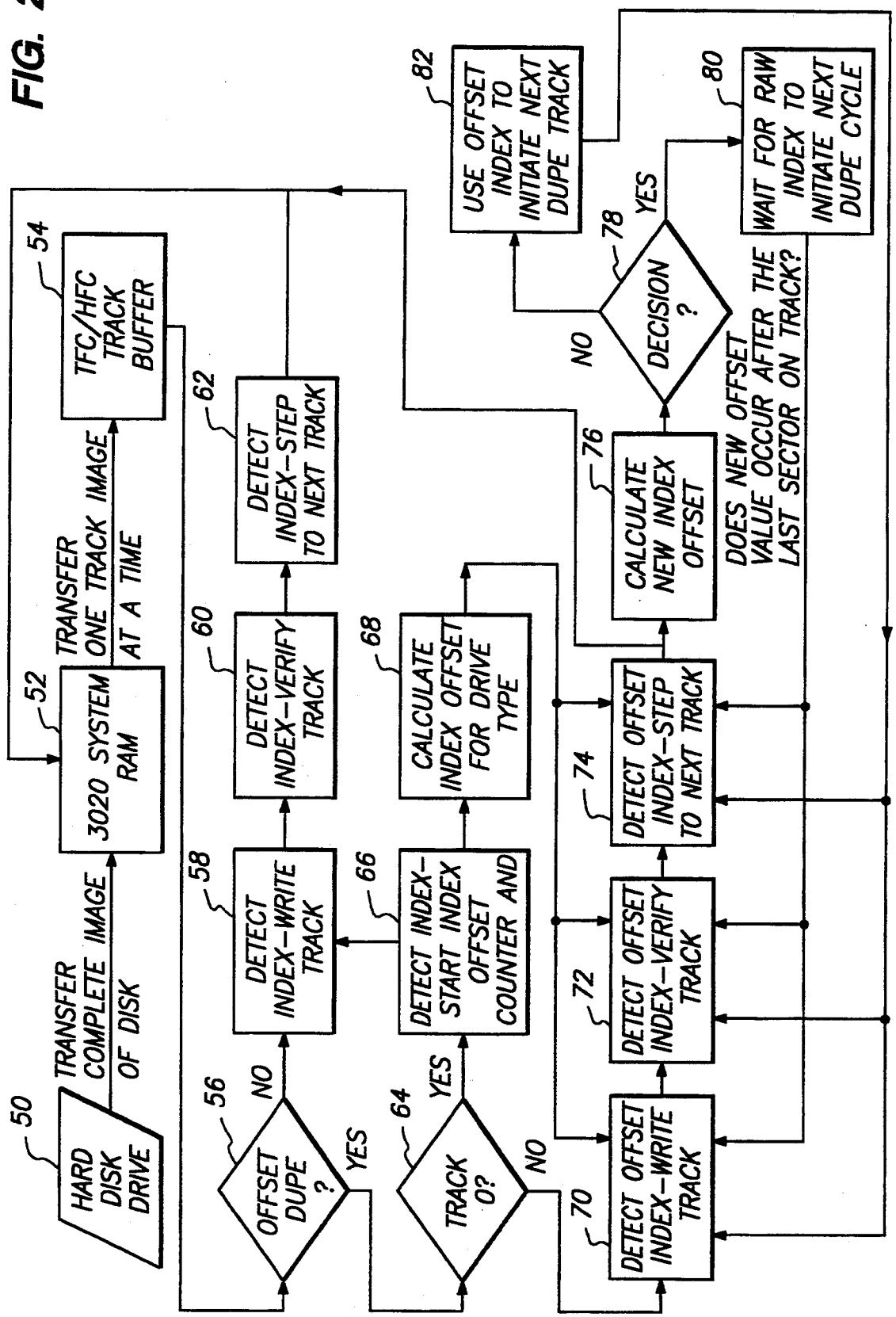
FIG. 2 is a flow diagram of the method of duplication illustrated in FIG. 1.

The flow diagram of FIG. 2 represents the sequencing of the process by such duplicating equipment. A complete "image" of a disk, i.e., all the data to be duplicated on the disk and the formating codes such as track and sector addresses, is transferred from a hard disk drive 50 to system memory, represented as a 3020 System RAM 52. During duplication, one track "image", e.g., the nine sectors on a track, is transferred at a time from System RAM 52 to a random access memory represented as a TFC/HFC track buffer 54. Buffer 54 has been modified so that it can be accessed to start reading out data at the beginning of each sector, i.e., at nine different points in the track image. As represented by a block 56 (OFFSET DUP NO), if offset (from the index mark) duplication is not selected, i.e., conventional synchronism (to the index mark) duplication is selected, the index mark is detected and the data is written on the track without an offset beginning with sector 1 and ending with sector 9, as represented by a block 58. As represented by a block 60, the index mark is detected a second time and the data previously written is verified, again without an offset beginning with sector 1 and ending with sector 9. As represented by block 62, when the index mark is detected a third time, the recording head moves to the next track and, as represented by the arrow to RAM 52, simultaneously a command is sent to RAM 52 to transfer another track of data to track buffer 54. This process is repeated for each track with the write, verify, and head move synchronized to begin when the index mark is detected.

If offset duplication in accordance with the invention is selected, as represented by a block 56 (OFFSET DUP YES), it is determined if the write head is at track 0, as represented by a block 64. Since the disk is clean, i.e., it is not formatted, track 0 is defined by a mechanical stop on the write head and the other tracks are defined by incrementing a counter from track 0 as the write head is advanced from track to track. At the start of the duplicating process, the write head is commanded to the stop at track 0. If a position sensor determines that the write head is at the stop (TRACK 0 YES), when the index mark is detected, an index offset counter is started, as represented by a block 66, the offset from the index mark for the next track, namely track 1, is calculated, as represented by a block 68, and the data is written on the track as in the conventional synchronism duplication, as represented by the arrow to block 58. Thus, when the index mark is detected, the data is written on the track beginning with sector 1 and ending with sector 9, as represented by block 58; when the index mark is detected a second time, the data previously written is verified, again beginning with sector 1 and ending with sector 9, as represented by block 60; and when the index mark is detected a third time, as represented by block 62, the recording head moves to the next track, namely track 1, and simultaneously a command is sent to RAM 52 to transfer another track of data to track buffer 54. As the disk rotates, the index offset counter is advanced responsive to a clock synchronized to the disk rotation.

For recording on track 1 the process recycles through block 56 (OFFSET DUP YES) and block 64 (TRACK 0 NO) to detect the offset from the index mark last calculated, as represented by arrows from block 68 to blocks 70, 72 and 74. When the offset from the the index mark is detected, the data is read out of RAM 52 and written on track 1 successively sector by sector beginning with sector 3 and ending with sector 2, as represented by a block 70. As represented by a block 72, when the offset from the index mark is detected a second time, the data previously written is verified, again beginning with sector 3 and ending with sector 2. As represented by block 74, when the offset from the index mark is detected a third time, the recording head moves to the next track, namely track 2, as represented by the arrow to RAM 52, a command is sent to RAM 52 to transfer another track of data, namely track 2, to track buffer 54, and, as represented by a block 76, the new offset from the index for the next track, namely track 2, is calculated. As part of the detection of the offset from the index mark represented by blocks 70, 72, and 74, the index offset counter output is compared with the calculated index offset. When the two match, described action is taken.

Before duplication of data begins on track 2, a decision based on the new offset is made whether the new offset value occurs after the last sector on the track, as represented by a block 78. If the decision is NO, as in the case of track 2, the new offset from the index mark is used to initiate the next duplication cycle, as represented by the arrows from a block 82 to blocks 70, 72, and 74. For recording on track 2, the process again recycles through block 56 (OFFSET DUP YES) and block 64 (TRACK 0 NO) to detect the offset from the index mark last calculated, as represented by the arrows from block 68 to blocks 70, 72 and 74. When the offset from the index mark is detected, the data is read out of RAM 52 and written on track 2 successively sector by sector beginning with sector 6 and ending with sector 5, as represented by block 70. As represented by block 72, when the offset from the index mark is detected a second time, the data previously written is verified, again beginning with sector 6 and ending with sector 5. As represented by block 74, when the offset from the index mark is detected a third time, the recording head moves to the next track, namely track 3, as represented by the arrow to RAM 52, a command is sent to RAM 52 to transfer another track of data, namely track 3, to track buffer 54, and, as represented by a block 76, the new offset from the index for the next track, namely track 3, is calculated.

The process is repeated for tracks 3, 4, 5, and 6 beginning with sectors 9, 2, 5, and 8, respectively. For track 7, the new offset value occurs after the last sector on the track begins, so the decision of block 78 is YES. Then, as represented by the arrows from a block 80 to blocks 70, 72, and 74, the process waits for the index mark to initiate the next duplication cycle, the index offset count is reset, and the process repeats as described in connection with tracks 0 to 6. Track 7 is duplicated responsive to the index mark without offset and tracks 8 to 13 are duplicated with the offsets set forth in Table II as the index offset counter is advanced after being reset. This process repeats, each track being duplicated with the offset set forth in Table II.

In summary, the data to be duplicated on an entire floppy disk is recorded on the disk so the sectors of all the tracks are aligned with each other. In other words, the sectors on all the tracks having the same sector address are recorded in the same arc segmental area of the disk.

The offset values are calculated for the characteristics of the data format and the disk drive used to duplicate the data, depending upon the step time, the settle time, the rotational speed, and the format of the data. Alternatively, the offset values could be precalculated or determined empirically and organized in a look up table such as Table II.

The described embodiment of the invention is only considered to be preferred as illustrative of the inventive concept; the scope of the invention is not to be restricted to such embodiments. Various and numerous other arrangements may be devised by one skilled in the art without departing from the spirit and scope of this invention.

What is claimed is:

1. A method for duplicating a continuous stream of data, including sector data defining sectors, on a rotating magnetic disk using a magnetic recording head that is selectively positionable from track to track within a recording head delay time to record the data on adjacent track for defining the sectors as aligned with each other from track to track and as referenced to an index mark, the method comprising the steps of:

rotating the magnetic disk;

sensing the index mark as the magnetic disk rotates;

determining an angular displacement of the rotating magnetic disk from the index mark that includes both a pre-calculated offset value and a value indicative of the recording head delay time;

recording the data stream in sequence on one track beginning at a selected data point in the data stream which corresponds to an angular displacement of the rotating magnetic disk from the index mark that exceeds the combined pre-calculated offset value and a value indicative of the recording head delay time, and continuing the recording of the data stream for substantially the entire one track from the angular displacement, without relying upon predefined format data on the magnetic disk, before moving the magnetic recording head to an adjacent track;

moving the magnetic recording head from one track to an adjacent track on the rotating magnetic disk; and recording the data stream in sequence on the adjacent track at a different selected data point in the data stream which corresponds to a different angular displacement of the rotating magnetic disk relative to the index mark to record all the data including sector data defining sectors on the adjacent track, without relying upon predefined format data on the magnetic disk, before moving the magnetic recording head to the next adjacent track.

2. The method of claim 1, wherein in the recording step, the data recording begins with next sector data at an angular displacement corresponding to the next sector position encountered after the recording head arrives at an adjacent track.

3. A method of duplicating a continuous stream of data, including sector data defining sectors, on a rotating magnetic disk using a magnetic recording head that is selectively positionable from track to track within a recording head delay time to record the data on adjacent tracks for defining the sectors as aligned with each other from track to track and as referenced to an index mark, the method comprising the steps of:

rotating the magnetic disk;

sensing the index mark as the magnetic disk rotates;

moving the magnetic recording head to a first track on the magnetic disk;

recording the data stream in sequence on the first track beginning at the index mark and defining sectors on the magnetic disk, without relying upon predefined format data on the magnetic disk;

moving the magnetic recording head from the first track to an adjacent second track on the rotating magnetic disk within the recording head delay time, after the data including sector data for the entire track has been recorded on the first track;

determining an angular displacement of the rotating magnetic disk from the index mark that includes both a pre-calculated offset value and a value indicative of the recording head delay time;

recording the data stream in sequence on the second track beginning at a selected data point in the data stream which corresponds to an angular displacement of the rotating magnetic disk from the index mark that exceeds the combined pre-calculated offset value and a value indicative of the recording head delay time, without relying upon predefined format data on the magnetic disk, and continuing the recording of the data stream for substantially the entire second track before moving the magnetic recording head to an adjacent track; and repeating the moving and the recording steps for each track on the magnetic disk to continue recording the stream of data on every track, including all the sector data on a track, without relying upon predefined format data on the magnetic disk, before moving the magnetic recording head to an adjacent track.

4. A method for duplicating a continuous stream of data, including sector data defining sectors, on a rotating magnetic disk using a magnetic recording head that is selectively positionable from track to track within a recording head delay time to record the data on adjacent tracks, for defining the sectors as aligned with each other from track to track and as referenced to an index mark, the method comprising the steps of:

rotating the magnetic disk;

sensing the index mark as the magnetic disk rotates;

counting the time elapsed since sensing the index mark to define an angular displacement from the index mark including a pre-calculated offset value corresponding to a particular sector having a particular angular displacement from the index mark on the magnetic disk;

moving the magnetic recording head to a first track on the magnetic disk;

recording the data stream in sequence on the first track referenced to the index mark and defining sectors on the magnetic disk without relying upon predefined format data on the magnetic disk;

moving the magnetic recording head from the first track to an adjacent second track on the rotating magnetic disk within the recording head delay time, after all the data including sector data for the entire track has been recorded on the first track;

counting the time elapsed since sensing the index mark from determining therefrom an angular displacement of the rotating magnetic disk from the index mark that includes both a pre-calculated offset value and a value indicative of the recording head delay time;

recording the data stream in sequence on the second track beginning at a selected data point in the data stream, which corresponds to an angular displacement of the rotating disk from the index mark that exceeds the combined pre-calculated offset value and recording head delay time, and at a different angular displacement from the index mark, and beginning with the next sector data at the next sector position encountered in the data stream after the recording head arrives at the second track, without relying upon predefined format data on the magnetic disk, and continuing the recording of the data stream for substantially the entire second track;

moving the magnetic recording head from the second track to an adjacent third track on the rotating magnetic disk within the recording head delay time after all the data including sector data for the entire track has been recorded on the second track;

recording the data stream in sequence on the third track beginning at a selected data point in the data stream which corresponds to an angular displacement of the rotating magnetic disk from the index mark that exceeds the combined pre-calculated offset value and a value indicative of the recording head delay time, and at a different angular displacement from the index mark, and beginning with the next sector data at the next sector position encountered in the data stream after the magnetic recording head arrives at the third track, without relying upon predefined format data on the magnetic disk, and continuing the recording of the data stream for substantially the entire third track; and repeating the recited moving and recording steps for each track on the disk to continue recording the stream of data on each track beginning with the next sector data at the next sector position encountered in the data stream after the magnetic recording head arrives at the track and including all the sectors of data on a track, without relying upon predefined format data on the magnetic disk, before the magnetic recording head is moved to the next track.

* * * * *